United States Patent
Mamidi et al.

(10) Patent No.: US 11,836,641 B2
(45) Date of Patent: Dec. 5, 2023

(54) MACHINE LEARNING-BASED PREDICTION OF METRICS AT EARLY-STAGE CIRCUIT DESIGN

(71) Applicant: Synopsys, Inc., Sunnyvale, CA (US)

(72) Inventors: Ravi Mamidi, Milpitas, CA (US); Siddhartha Nath, San Jose, CA (US); Wei-Ting Chan, Portland, OR (US); Vishal Khandelwal, Portland, OR (US)

(73) Assignee: SYNOPSYS, INC., Sunnyvale, CA (US)

( * ) Notice: Subject to any disclaimer, the term of this patent is extended or adjusted under 35 U.S.C. 154(b) by 242 days.

(21) Appl. No.: 17/201,560

(22) Filed: Mar. 15, 2021

(65) Prior Publication Data
US 2021/0287120 A1    Sep. 16, 2021

Related U.S. Application Data

(60) Provisional application No. 62/989,687, filed on Mar. 14, 2020.

(51) Int. Cl.
| | |
|---|---|
| *G06N 5/04* | (2023.01) |
| *G06N 20/00* | (2019.01) |
| *G06F 30/398* | (2020.01) |
| *G06F 111/04* | (2020.01) |
| *G06F 119/06* | (2020.01) |

(52) U.S. Cl.
CPC ............. *G06N 5/04* (2013.01); *G06F 30/398* (2020.01); *G06N 20/00* (2019.01); *G06F 2111/04* (2020.01); *G06F 2119/06* (2020.01)

(58) Field of Classification Search
CPC .... G06F 30/398; G06F 2119/06; G06F 30/30; G06F 2111/04; G06N 20/00; G06N 5/04; G06N 5/01
See application file for complete search history.

(56) References Cited

U.S. PATENT DOCUMENTS

| | | | |
|---|---|---|---|
| 10,607,039 B1* | 3/2020 | Kinderman | ............ G05B 17/02 |
| 10,949,585 B1* | 3/2021 | Winefeld | ................. G06N 3/08 |

(Continued)

OTHER PUBLICATIONS

Barboza, Erick et al. "Machine Learning-Based Pre-Routing Timing Prediction with Reduced Pessimism," (DAC) 2019 IEEE, Las Vegas, NV, 6 pages.
Chan, Wei-Ting J. et al., "Learning-Based Prediction of Embedded Memory Timing Failures During Initial Floorplan Design," 2016 IEEE, 8 pages.

(Continued)

*Primary Examiner* — Nha T Nguyen
(74) *Attorney, Agent, or Firm* — Lewis Roca Rothgerber Christie LLP

(57) ABSTRACT

When designing circuits to meet certain constraint requirements, it is challenging to determine whether a given circuit design will meet the constraints. A designer at an early stage of the circuit design (e.g., synthesis or placement) may have limited information to rely on in order to determine whether the eventual circuit, or some design variation thereof, will satisfy those constraints without fully designing the circuit. The approaches described herein use a machine learning (ML) model to predict, based on features of partial circuit designs at early stages of the design flow, whether the full circuit is likely to meet the constraints. Additionally, the disclosed approaches allow for the ranking of various circuit designs or design implementations to determine best candidates to proceed with the full design.

19 Claims, 14 Drawing Sheets

(56) References Cited

U.S. PATENT DOCUMENTS

| | | | | |
|---|---|---|---|---|
| 11,036,908 | B1* | 6/2021 | Chingudi | G06N 5/04 |
| 11,048,852 | B1* | 6/2021 | Fallon | G06N 20/20 |
| 11,227,087 | B1* | 1/2022 | White | G06F 18/2148 |
| 11,275,882 | B1* | 3/2022 | Zhang | G06F 30/398 |
| 2018/0197110 | A1* | 7/2018 | Rao | G06F 30/398 |
| 2018/0307790 | A1* | 10/2018 | Chuang | G06N 3/08 |
| 2019/0228126 | A1* | 7/2019 | Oh | G06F 30/327 |
| 2020/0134108 | A1* | 4/2020 | Possignolo | G06F 30/331 |
| 2020/0233931 | A1* | 7/2020 | Kourkoulos | G06F 30/33 |
| 2021/0097224 | A1* | 4/2021 | Lin | G06F 30/398 |
| 2021/0117603 | A1* | 4/2021 | Jiang | G06N 3/08 |
| 2021/0357811 | A1* | 11/2021 | Yamada | G06F 30/39 |
| 2022/0004900 | A1* | 1/2022 | Salahuddin | G06F 30/27 |
| 2022/0027536 | A1* | 1/2022 | Dutta | G06N 20/00 |
| 2023/0086307 | A1* | 3/2023 | Sivaswamy | G06F 3/0661 |

OTHER PUBLICATIONS

Han, Seung-Soo, "A Deep Learning Methodology to Proliferate Golden Signoff Timing," 978-3-9815370-2-4 (EDAA) 2014 IEEE, 6 pages.

Kahng, Andrew B., "INVITED: Reducing Time and Effort in IC Implementation: A Roadmap of Challenges and Solutions," DAC 2018, San Francisco, CA, USA, 6 pages.

Kahng, Andrew B. et al., "SI for Free: Machine Learning of Interconnect Coupling Delay and Transition Effects," 2015 IEEE, 8 pages.

Ng, Aaron and Markov, Igor L., "Toward Quality EDA Tools and Tool Flows Through High-Performance Computing," Sixth International Symposium on Quality Electronic Design, 2005 IEEE, 6 pages.

* cited by examiner

ML-QoR: Ranking Runs Results 1100

| | Place-opt TNS (ns) | Route-op: (Actual Value) TNS (ns) | Predicted Mean TNS (ns) | Sigma TNS (ns) | Predicted Lower 95% Conf. Interval TNS (ns) | Mean Rank | Sigma Rank | Lower CI Rank | Total Rank | Normalized Rank |
|---|---|---|---|---|---|---|---|---|---|---|
| Base | -268.7 | -62.22 | -60.76 | 3.25 | -54.39 | 7 | 6 | 7 | 20 | 7 |
| Run1 | -201.1 | -42.54 | -37.97 | 2.87 | -32.30 | 5 | 5 | 5 | 15 | 5 |
| Run2 | -711.3 | -228.48 | -219.38 | 7.36 | -204.94 | 11 | 11 | 11 | 33 | 11 |
| Run3 | -199.3 | -39.3 | -35.24 | 2.69 | -29.95 | 3 | 3 | 2 | 8 | 3 |
| Run4 | -187.57 | -30.59 | -37.16 | 2.62 | -32.01 | 4 | 2 | 4 | 10 | 4 |
| Run5 | -195.54 | -30.54 | -32.66 | 1.66 | -29.39 | 1 | 1 | 3 | 5 | 1 |
| Run6 | -719.80 | -154.05 | -166.26 | 6.78 | -152.97 | 8 | 8 | 8 | 24 | 8 |
| Run7 | -699.15 | -189.31 | -205.30 | 7.34 | -190.9 | 10 | 10 | 9 | 29 | 10 |
| Run8 | -720.92 | -198.91 | -205.11 | 7.19 | -191 | 9 | 9 | 10 | 28 | 9 |
| Run9 | -223.42 | -47.90 | -46.21 | 3.28 | -39.78 | 6 | 7 | 6 | 19 | 6 |
| Run10 | -196.34 | -32.78 | -32.74 | 2.70 | -27.43 | 2 | 4 | 1 | 7 | 2 |

Customer 7nm design

FIG. 11

ML-QoR: Timing predictions (full data)

| | Place-opt TNS (ns) | Route-op: (Actual Value) TNS (ns) | ML-QoR Predicted TNS (ns) Lower Range (95% Conf. Interval) | ML-QoR Predicted TNS (ns) | ML-QoR Predicted TNS (ns) Upper Range (95% Conf. Interval) | Route-opt (Actual) NVE | ML-QoR Predicted NVE | P&R Runtime (Hrs) | Place-opt + Prediction (Hrs) |
|---|---|---|---|---|---|---|---|---|---|
| Base | -268.7 | -62.22 | -54.39 | -60.76 | -67.12 | 858 | 797 | 85 | 18 |
| Run1 | -201.1 | -42.54 | -32.20 | -37.97 | -43.65 | 921 | 711 | 64 | 18 |
| Run2 | -711.3 | -228.48 | -204.94 | -219.38 | -233.8 | 2373 | 1808 | 145 | 15 |
| Run3 | -199.3 | -39.3 | -29.95 | -35.24 | -40.53 | 1096 | 662 | 59 | 17.7 |
| Run4 | -187.57 | -30.59 | -32.01 | -37.16 | -42.31 | 733 | 645 | 69 | 15 |
| Run5 | -195.54 | -30.54 | -29.39 | -32.66 | -37.95 | 812 | 663 | 52 | 14.5 |
| Run6 | -719.80 | -154.05 | -152.97 | -166.26 | -179.47 | 2019 | 1659 | 117 | 15 |
| Run7 | -699.15 | -189.31 | -190.9 | -205.30 | -219.6 | 1970 | 1792 | 204 | 18 |
| Run8 | -720.92 | -198.91 | -191 | -205.11 | -218.43 | 2062 | 1667 | 266 | 19 |
| Run9 | -223.42 | -47.90 | -39.78 | -46.21 | -52.63 | 925 | 805 | 65 | 18 |
| Run10 | -196.34 | -32.78 | -27.43 | -32.74 | -38.05 | 1131 | 665 | 78 | 17 |

Customer 7nm design

ML-QoR: Routability Ranking Results

| | Actual Route-opt DRCs | ML-QoR Routing scores (internal) | ML-QoR Routing Rank |
|---|---|---|---|
| Base | 1993 | 47,093,481 | 7 |
| Run1 | 464 | 4,511,727 | 1 |
| Run2 | 14238 | 54,140,724 | 8 |
| Run3 | 392 | 5,667,624 | 2 |
| Run4 | 2919 | 39,524,220 | 6 |
| Run5 | 1102 | 15,436,818 | 4 |
| Run6 | 13132 | 72,299,493 | 10 |
| Run7 | 12235 | 58,727,025 | 9 |
| Run8 | 23675 | 99,257,994 | 11 |
| Run9 | 723 | 9,098,028 | 3 |
| Run10 | 948 | 16,741,863 | 5 |

Customer 7nm design

FIG. 14

MACHINE LEARNING-BASED PREDICTION OF METRICS AT EARLY-STAGE CIRCUIT DESIGN

RELATED APPLICATION

This application claims the benefit of U.S. Patent Application No. 62/989,687, filed Mar. 14, 2020, and entitled "Machine Learning-Based Prediction of Achievable QoR Metrics at Post-Route and Post-Route Optimization Stages to Enable Early-Stage Design Exploration," which is incorporated by reference in its entirety herein.

TECHNICAL FIELD

This disclosure relates to the field of electronic design automation (EDA) in general, and, more particularly, to the use of machine learning (ML) in prediction of quality of result (QoR) metrics of partial EDA circuit designs.

BACKGROUND

Design closure for many modern circuits, such as system-on-a-chip (SoC) designs, has become computationally complex. Additionally, physical designers spend significant time and resources trying to improve quality of the design at early stages such as at synthesis, initial placement, or placement optimization, by exploring multiple metrics such as performance, area, timing, power, etc.

Designers currently run multiple iterations of the implementation flow to observe quality of result (QoR) for each of their runs to get feedback. This process is time-consuming because a full implementation flow can take anywhere from a few days to a few weeks to complete.

Accordingly, what is needed are approaches to obtain QoR metrics for a design run at early design stages, thereby avoiding the time investment needed to observe such QoR metrics from a complete run.

SUMMARY

Disclosed herein are systems, methods, and computer program products for machine learning (ML)-based prediction of metrics at early-stage circuit design. In an exemplary approach, a partial circuit design run is generated for a circuit. A predicted quality-of-result (QoR) metric is produced for the partial circuit design run by executing an ML model on the partial circuit design run. This ML model has been trained using features extracted from a training circuit at a development phase and actual QoR metrics from a completed design run of the training circuit. Based on the predicted QoR metric, a determination is made that the partial circuit design run satisfies a constraint on the predicted QoR metric. And, based on this determination, a complete circuit design run is executed for the circuit from the partial circuit design run.

This Summary does not attempt to provide the complete significance of any particular innovation, embodiment, or example as it can be used in commerce. Additionally, this Summary is not intended to signify key or critical elements of an innovation, embodiment or example or to limit the scope of the subject matter of this disclosure. The innovations, embodiments, and/or examples found within this disclosure are not all-inclusive, but rather describe the basic significance of the subject matter. Accordingly, one use of this Summary is as a prelude to a Detailed Description presented below.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 11 depicts an exemplary result of a set of ranking runs in an exemplary design, in accordance with an embodiment.

FIG. 12 illustrates exemplary results of timing prediction, in accordance with an embodiment.

FIG. 14 illustrates exemplary results of routability scoring, in accordance with an embodiment.

DETAILED DESCRIPTION

Figure 1:
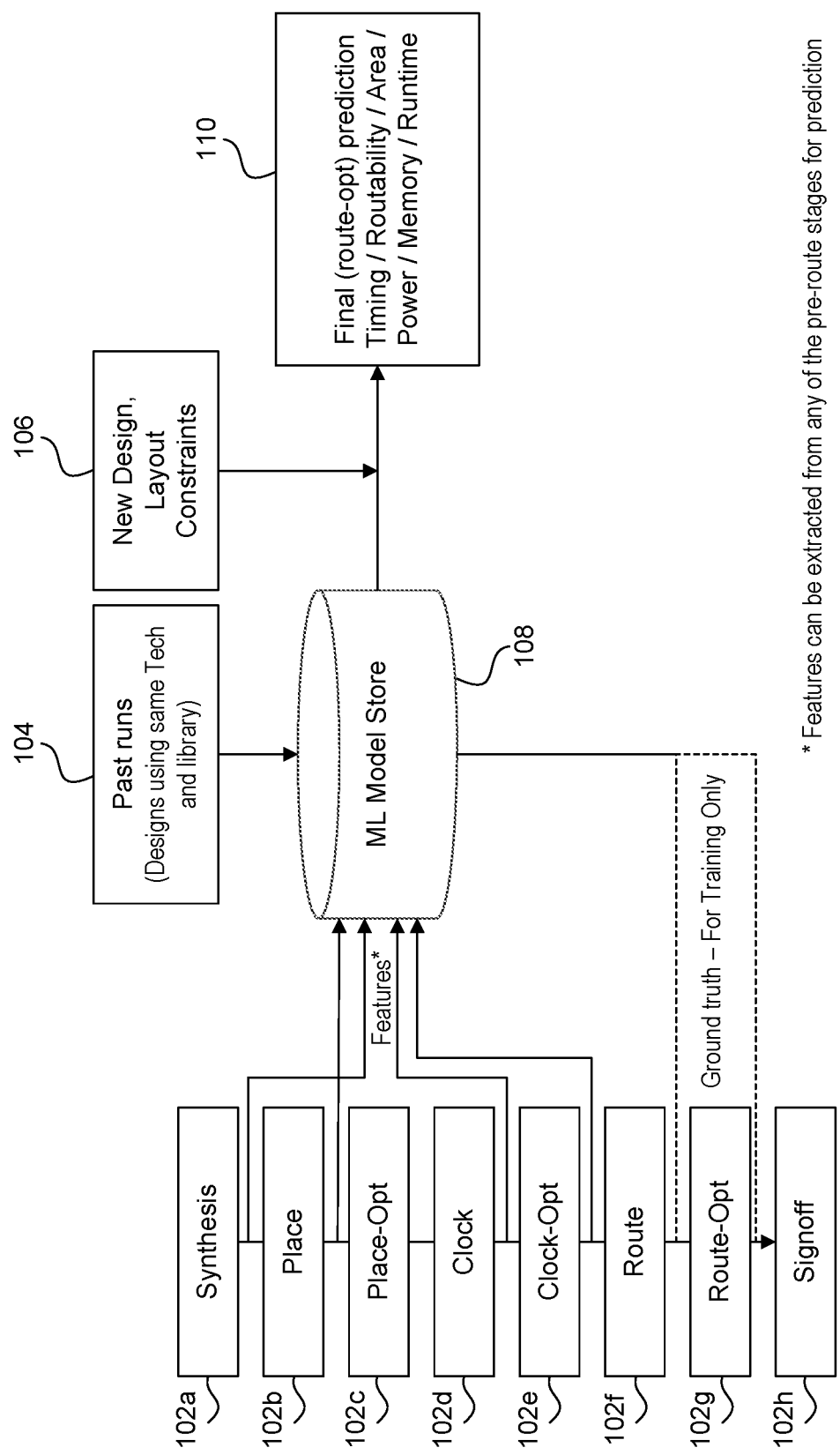
FIG. 1 illustrates a backend physical implementation flow having various stages from synthesis to route-opt/signoff, in accordance with an embodiment.

Aspects of the present disclosure relate to machine learning (ML)-based prediction of metrics at early-stage circuit design. Circuit designers working at early design stages (e.g., synthesis, placement, placement optimization, etc.) must typically decide among multiple possible design solutions to fully simulate. The process of fully simulating a circuit can be time-consuming, especially for more complex circuits, such as system-on-a-chip (SoC) designs. The approaches disclosed herein allow a designer to analyze an early-stage circuit design using an ML-model to predict whether the final circuit design will meet design constraints.

Currently, no tools exist that can provide the needed accurate and reliable estimate of quality of result (QoR) metrics in the early stages of the design and flow. In particular, tools are needed to provide predictions regarding whether a given circuit design run has the potential to meet a QoR target, or whether it should be discarded to save resources. Existing heuristic models lack the accuracy of the disclosed ML model approach, as well as the simple integration into the early stage design flow disclosed herein. Typical QoR metrics that are optimized for include timing, routability, area, power, runtime, and memory for each full-flow run. Designers have come to rely on a number of heuristic approaches to estimate these QoR metrics at early design stages, but a number of complicating factors such as advanced node technologies can exacerbate the differences between predicted QoR metrics and the actual metrics that can only be determined through a full-flow run. And since a full-flow run can typically take days to complete, better predictive models are needed.

In addition to providing predictions against QoR target constraints, the ML models disclosed herein can aid early-stage circuit designers by providing a fast and accurate method to predict end-of-flow QoR and bottlenecks. These metrics can be provided as feedback to the designer in real-time to aid in the improvement of register transfer level (RTL) synthesis, constraints, and floorplan in early stages such as synthesis and placement.

Additionally, when a designer has multiple possible designs available that can satisfy QoR target constraints, the ML models disclosed herein can provide designers with an accurate method to rank multiple runs at early design stages based on estimated end-of-flow QoR metrics using order statistics. This allows the designer to proceed with a full design for only the highest-ranked early stage designs that are expected to best satisfy a given set of QoR targets. Currently, ranking multiple designs based on QoR metrics again requires a full-flow run for accuracy.

The QoR "look-ahead" prediction and ranking methodology uses ML techniques to model, at various design stages during the development flows associated with one or more completed circuit designs, how each of the following aspects impact QoR metrics of the final circuit designs: (1) placement changes during optimizations; (2) netlist changes due to clock-tree-synthesis (CTS) and multiple rounds of optimization; (3) impact of routing on timing windows; (4) timer and extraction changes; and (5) user flow settings.

The ML-QoR model is then used during development of new circuit designs to (a) identify which design runs have the potential to meet an established QoR target, and which runs can be discarded to save resources, (b) quickly and accurately predict end-of-flow QoR and bottlenecks that are provided as feedback to improve RTL/constraints/floorplan during synthesis and placement stages of the circuit design's development, and (c) accurately rank multiple runs at early design stages based on estimated end-of-flow QoR metrics using order statistic methods.

FIG. 1 illustrates a backend physical implementation flow 100 having various stages from synthesis to route-opt/signoff, in accordance with an embodiment. Various stages 102a-102h are depicted, which correspond to exemplary design stages for an implementation flow of a circuit design. Features are extracted from partial circuits at each of various early design stages (e.g., stages 102a-102e) and provided to each of a variety of ML models in ML model store 108 for processing.

During training, the results of later design stages (e.g., stages 102f-102g) can be used as ground truth for determining actual QoR metrics and adjusting ML models in ML model store 108 accordingly. Features extracted from early design stages 102a-102e can be weighted differently during training in order for the ML models in ML model store 108 to produce the QoR metrics results known at the end of the late design stages 102f-102g. In accordance with an embodiment, ground truth labels are collected for each of the QoR metrics at the post-route stage, at detail-route 102f or at post-route optimization 102g steps.

In machine learning, the term "ground truth" refers to the accuracy of a training set's classification for supervised learning techniques. This is used in statistical models to prove or disprove a research hypotheses. The term "ground trothing" refers to the process of gathering the proper objective (provable) data for this test. As an example, Bayesian spam filtering is a typical use case for supervised learning in which the algorithm is manually taught the differences between spam and non-spam. This depends on the ground truth of the messages used to train the algorithm—inaccuracies in the ground truth will correlate to inaccuracies in the resulting spam/non-spam verdicts.

For the various ML models in ML model store 108, different ground truths are collected at the late stages 102f-102g of the design flow. For timing prediction, ground truth features are collected for all constrained endpoints in each multi-corner multi-mode scenario. For routability prediction, ground truth features are collected after detail routing 102f is performed on a design. For area/power, ground truth features are collected for all instances in each multi-corner multi-mode scenario. These features are used as the ground truth based on the assumption that they contribute to changes in power and area during the implementation flow. One skilled in the relevant arts will appreciate that other features may be collected as appropriate to establish the needed ground truths for a completed circuit design.

Past runs 104 can be used to provide these features used in training. In accordance with an embodiment, past runs 104 are selected for use in the ML models of ML model store 108 based on previous implementation runs of a same design (early versions) or similar designs that used the same technology and process as a partial circuit under test. These saved past runs 104 can then have the needed features extracted for use in training to a particular partial circuit design based on similar characteristics of the saved past runs 104 to the partial circuit design. By way of non-limiting example, an associated location vector indicating relative placement locations of two associated cells in a given placement solution, and an associated path-stage vector indicating the number of stages present in the signal path between the two cells in the placement solution run, can be extracted. The training phase may include multiple designs or multiple implementations of the same design that are obtained by varying constraints, flow settings and layout contexts.

Past runs 104 can be generated, during a development phase of a training circuit design, using a conventional electronic design automation (EDA) tool (e.g., a placement tool, a place_opt tool, a routing tool, a route_opt tool, etc.) to generate a plurality of completed circuit design runs. For example, a placement EDA tool is used to generate placement solution runs for the current version of the first circuit design, where each placement solution run is generated by applying an associated set of pre-conditions to the current test circuit design and then performing all conventional placement tool operations needed to generate a completed placement solution.

For example, when the placement tool completes the placement process, an actual delay/timing value for each pair of associated cells is calculated using known techniques, and then the delay/timing model is modified as needed (e.g., using known techniques such as mean squared error loss) such that its prediction for each pair of associated cells more accurately corresponds to the calculated actual delay/timing value. That is, during an early phase of the model training process the model may generate relatively inaccurate predicted timing/delay values that differ significantly from the actual delay/timing values calculated at the end of each training run, but over time the model is gradually modified until it generates predicted delay/timing values that accurately match the actual delay/timing values.

In an execution flow for the ML models, an EDA tool is configured to run flows on a set of designs for an early stage, e.g., place_opt 102c. As part of the training process, training features are extracted at this early stage. The EDA tool continues to run through the end of routing 102f and route_opt 102g. For prediction of design rule checking (DRC), labels are extracted after detailed routing 102f. For the prediction of timing and power, labels are extracted at the end of route_opt 102g.

ML model store 108 includes a plurality of ML models, each trained to predict a separate QoR metric. For example, the disclosed ML training algorithms can be used to train a delay/timing ML model that predicts an amount of time ("delay/timing") needed to transmit a signal between two associated cells used in a given placement solution run.

With this training approach, the ML models in ML model store 108 can be configured to account for a variety of factors early in the design implementation flow that can affect QoR metrics, such as placement changes during optimizations, netlist changes due to clock tree synthesis (CTS) and multiple rounds of optimization, impact of routing on timing windows, timer and extraction changes, and user flow settings. In subsequent runs of the same modified designs or on new designs, the EDA tool will only run through an early design stage (e.g., 102a or 102b), at which point it will extract prediction features.

With the ML models in ML model store 108 trained, features from early design stages such as stages 102a-102e can be provided to the ML models to predict a variety of QoR metric predictions 110, such as QoR predictions for timing, routability, area, power, runtime, and memory for a partial circuit design. Additionally, design and layout constraints 106 can be provided by varying constraints, flow settings, and layout contexts to determine QoR predictions 110 for multiple designs or multiple implementations of the same design. QoR predictions 110 can therefore be provided without full circuit design. Designers can explore parameters, constraints, floorplan, and flow settings in runtime in an efficient manner.

In addition to predicting achievable QoR metrics in early design stages, it is possible for an EDA tool to provide multiple partial circuit designs (e.g., manually selected or generated based on constraints 106) for which QoR predictions 110 can be generated. For a given QoR metric, these design runs can then be ranked against each other, providing a designer with an understanding of which of the runs are most likely to produce the best results for a given QoR metric. The designer may then use this ranking to proceed with a full design of one or more of the highest ranking partial designs, and discard the rest. In accordance with an embodiment, a conventional EDA tool may be used to generate the completed circuit design runs for the highest-ranked partial circuit design(s).

Figure 2:
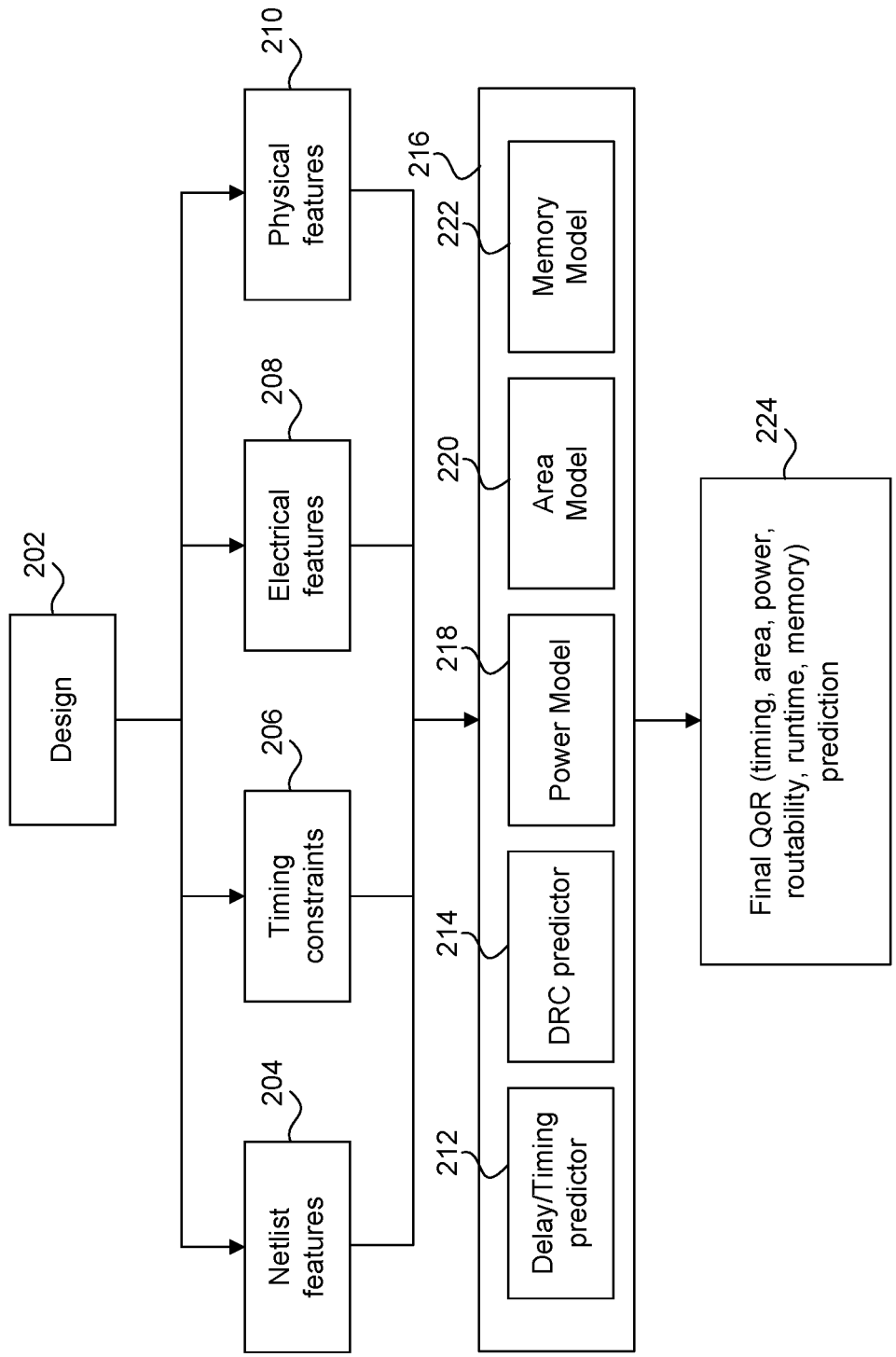
FIG. 2 illustrates predictive elements of ML-QoR modeling and prediction flow, in accordance with an embodiment.

FIG. 2 illustrates predictive elements of ML-QoR modeling and prediction flow 200, in accordance with an embodiment. Design 202 is a partial circuit design in early stages of design (e.g., at physical synthesis or post-placement). Features to be analyzed by a ML-QoR model from design 202 are extracted, such as netlist features 204, timing constraints 206, electrical features 208, and physical features 210, in accordance with an embodiment.

These features 204, 206, 208, and 210 are provided to a variety of ML-QoR models in order to predict QoR metrics. For example, delay/timing predictor 212, DRC predictor 214, power model 218, area model 220, and memory model 222 are all examples of ML-QoR models 216 used to predict corresponding QoR metrics. These ML-QoR models 216 can provide a final QoR prediction 224 for each of a variety of QoR metrics, such as timing, area, power, routability, runtime, and memory.

One skilled in the relevant arts will appreciate that ML-QoR models 216 can be trained in a variety of different manners using the aforementioned training approaches. The specifics of each of these individual ML-QoR models 216 is not discussed herein. However, for facilitating understanding, each of ML-QoR models 216 may be described broadly by way of specific predictions made, given early stage/pre-route features such as features 204, 206, 208, and 210. For example, delay/timing predictor 212 (ML-Delay) may be trained to predict timing after a route optimization stage. DRC predictor 214 (ML-DRC) may be trained to predict DRC severity and heatmaps after detailed routing. Power model 218 (ML-Power) may be trained to predict internal leakage of cells and switching power of nets after the route optimization stage. Area model 220 (ML-Area) may be trained to predict a quantity of cells and area of cells after the route optimization stage. And memory model 222 (ML-Memory) may be trained to predict peak memory usage of the routing and route optimization stages.

Figure 8:
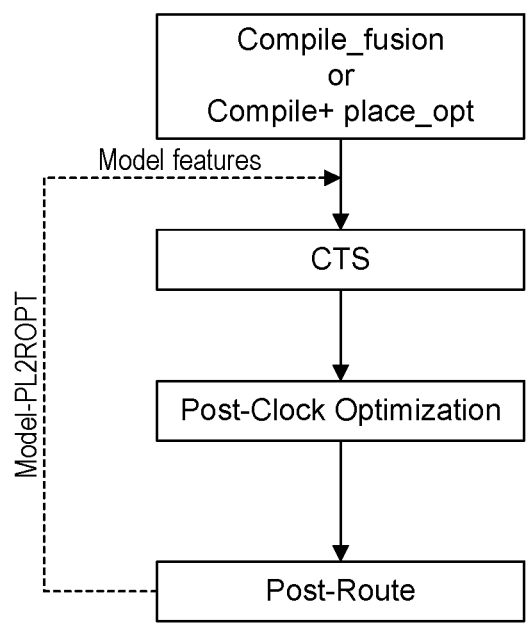
FIG. 8 illustrates an integration of ML-QoR with ICCII/FC, in accordance with an embodiment.

The ensemble of ML-QoR models 216 enables prediction of a single design as well as multiple designs or multiple implementations of the same design by varying constraints, flow settings, and layout contexts. During a testing phase, ML-QoR models are relied on for their QoR predictions based on the partial circuit of design 202, and EDA tools are not run through the end of the design flow. For each predictor in the ensemble (ML-Delay, ML-DRC, ML-Power, etc.), features extracted in early stages are sufficient to describe netlist transformations in a lookahead manner. FIG. 8 illustrates an integration 800 of ML-QoR with the Synopsys IC Compiler II (ICCII) and Fusion Compiler (FC), in accordance with an embodiment.

Figure 3:
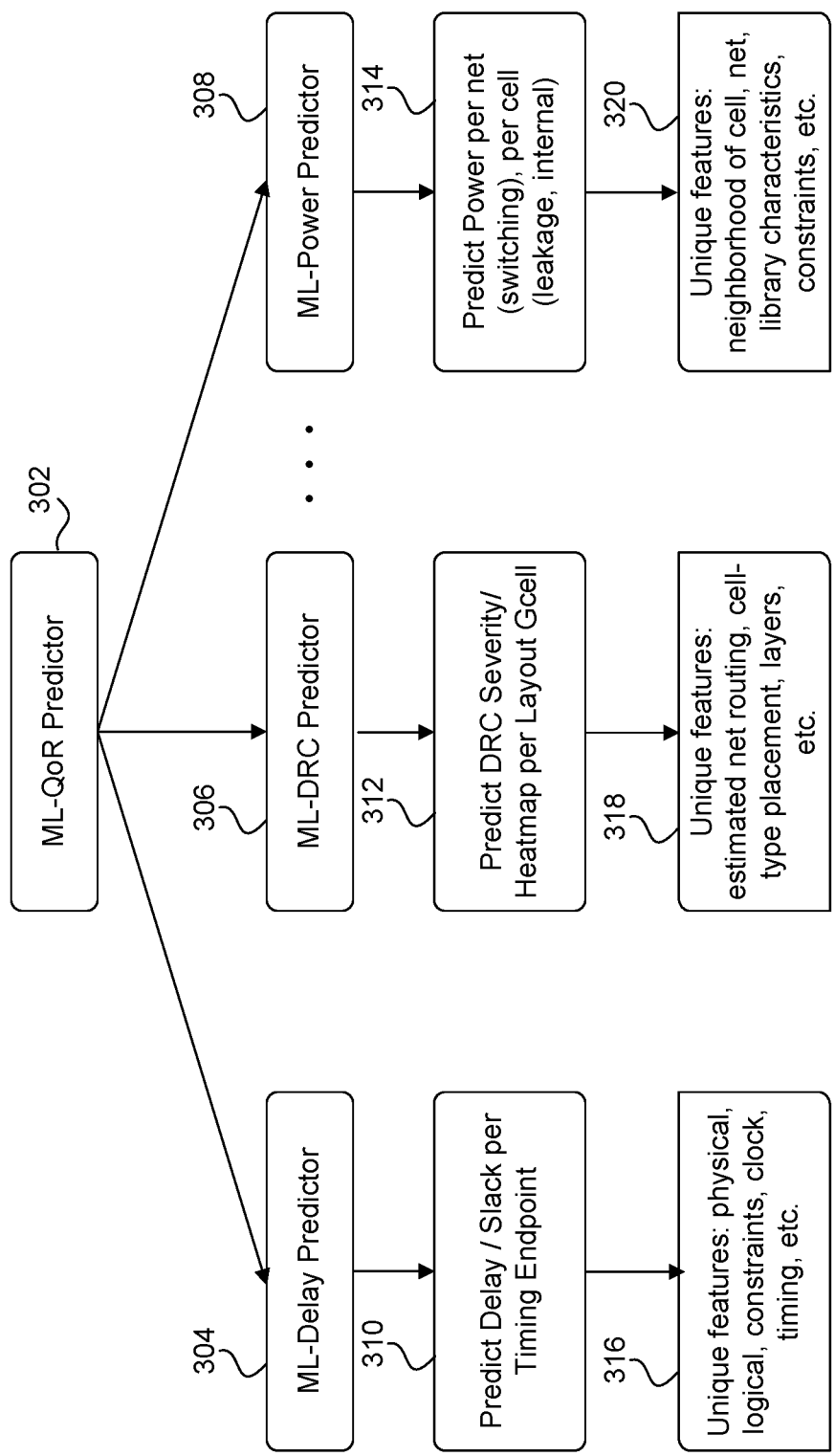
FIG. 3 is a flow diagram illustrating exemplary predictors utilized by the ML-QoR modeling and prediction flow, in accordance with an embodiment.

FIG. 3 is a flow diagram 300 illustrating exemplary predictors utilized by the ML-QoR modeling and prediction flow, in accordance with an embodiment. ML-QoR predictor 302 can obtain results from a plurality of predictors, such as ML-Delay predictor 304, ML-DRC predictor 306, and ML-Power predictor 308 in order to determine an overall QoR prediction (e.g., a score). These exemplary predictors are configured to be called by and receive feature information for partial circuit designs from an EDA tool.

ML-QoR predictor 302 uses an ensemble of predictors, such as ML-Delay predictor 304, ML-DRC predictor 306, and ML-Power predictor 308, to enable prediction of a single design as well as multiple designs or multiple implementations of the same design by varying constraints, flow settings, and layout contexts.

For timing prediction, ML-Delay predictor 304 correlates pre- and post-route timing to predict delay/slack per timing endpoint at 310. ML-Delay predictor 304 makes these predictions by receiving unique features 316 from the EDA tool about the partial circuit design that include physical features, logical features, constraints, clocks, timing, etc. Likewise, ML-Delay predictor 304 is trained using these features from a partial circuit design, tested against ground truth information for the corresponding QoR results from the full circuit design.

Figure 9:
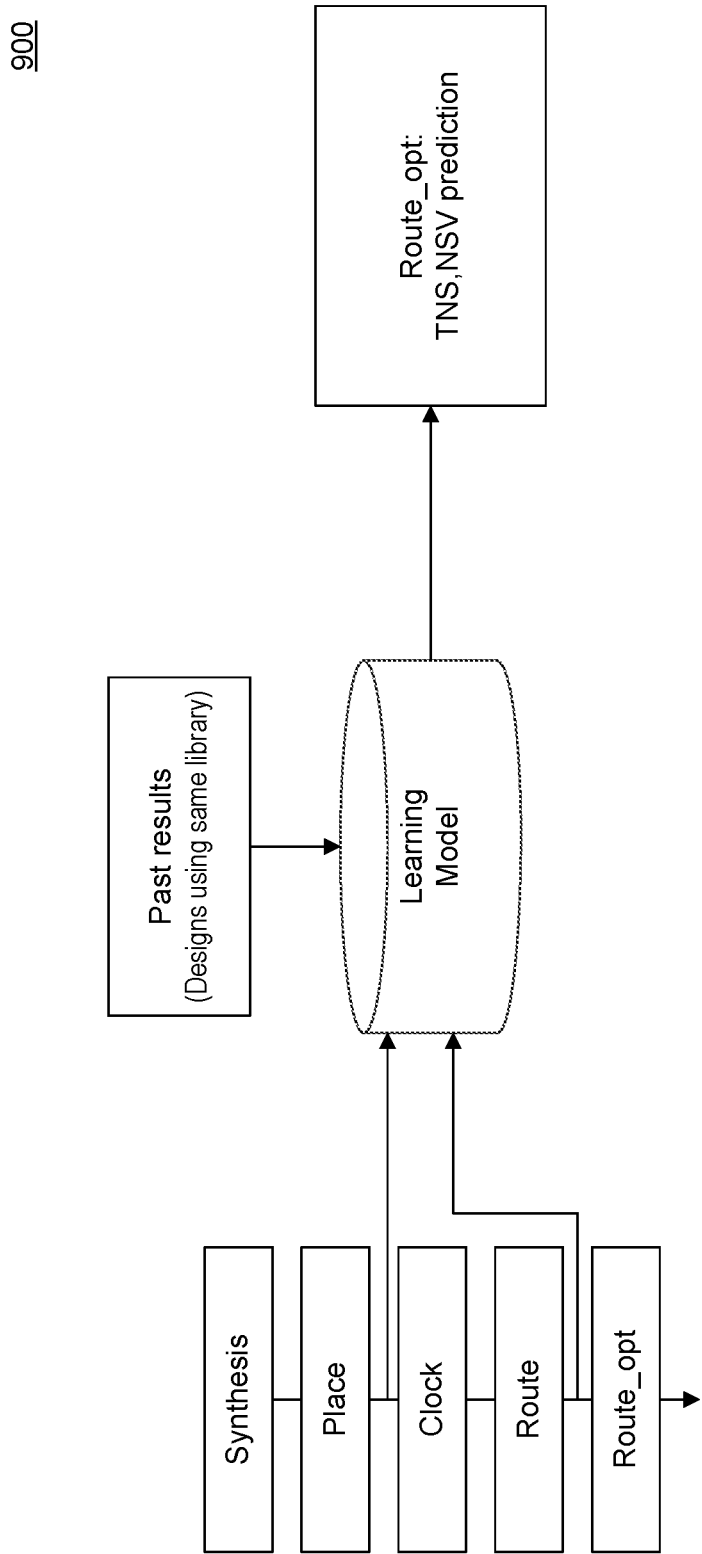
FIG. 9 illustrates a timing prediction flow with a ML timing model, in accordance with an embodiment.
Figure 10:
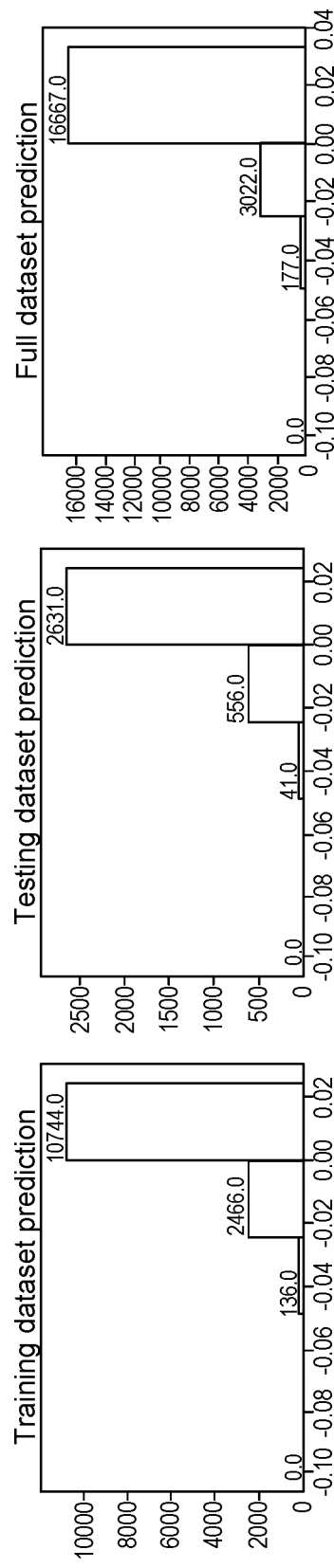
FIG. 10 illustrates an example timing prediction flow result, in accordance with an embodiment.

FIG. 9 illustrates a timing prediction flow with a ML timing model 900, in accordance with an embodiment. This flow is similar to that illustrated in FIG. 1, but is an exemplary approach specific to timing prediction. FIG. 10 illustrates an example timing prediction flow result 1000, in accordance with an embodiment. These results show the accuracy of the predictions from the timing models (e.g., ML-Delay predictor 304 of FIG. 3) and thereby its usability over needing to run a full-flow circuit design.

FIG. 12 illustrates exemplary results of timing prediction 1200, in accordance with an embodiment. Any machine learning-based prediction tooling will have modeling errors. The ML models described herein can factor in magnitude and distribution of errors using order statistics. In an embodiment, a confidence interval-based timing is computed for every endpoint prediction and a sum of ranks of mean, standard deviation, coefficient of variation, and confidence interval-based total negative slack (TNS) is used compute the final rank of each design/implementation. These results are shown computed for multiple results of timing prediction 1200 by way of non-limiting example.

For DRC prediction, ML-DRC predictor 306 predicts a severity of DRC errors and can provide a heat map per layout cell at 312. ML-DRC predictor 306 makes these predictions by receiving unique features 318 from the EDA tool about the partial circuit design that include estimated net routing, cell-type placement, layers, etc. Likewise, ML-DRC predictor 306 is trained using these features from a partial circuit design, tested against ground truth information for the corresponding QoR results from the full circuit design.

Figure 13:
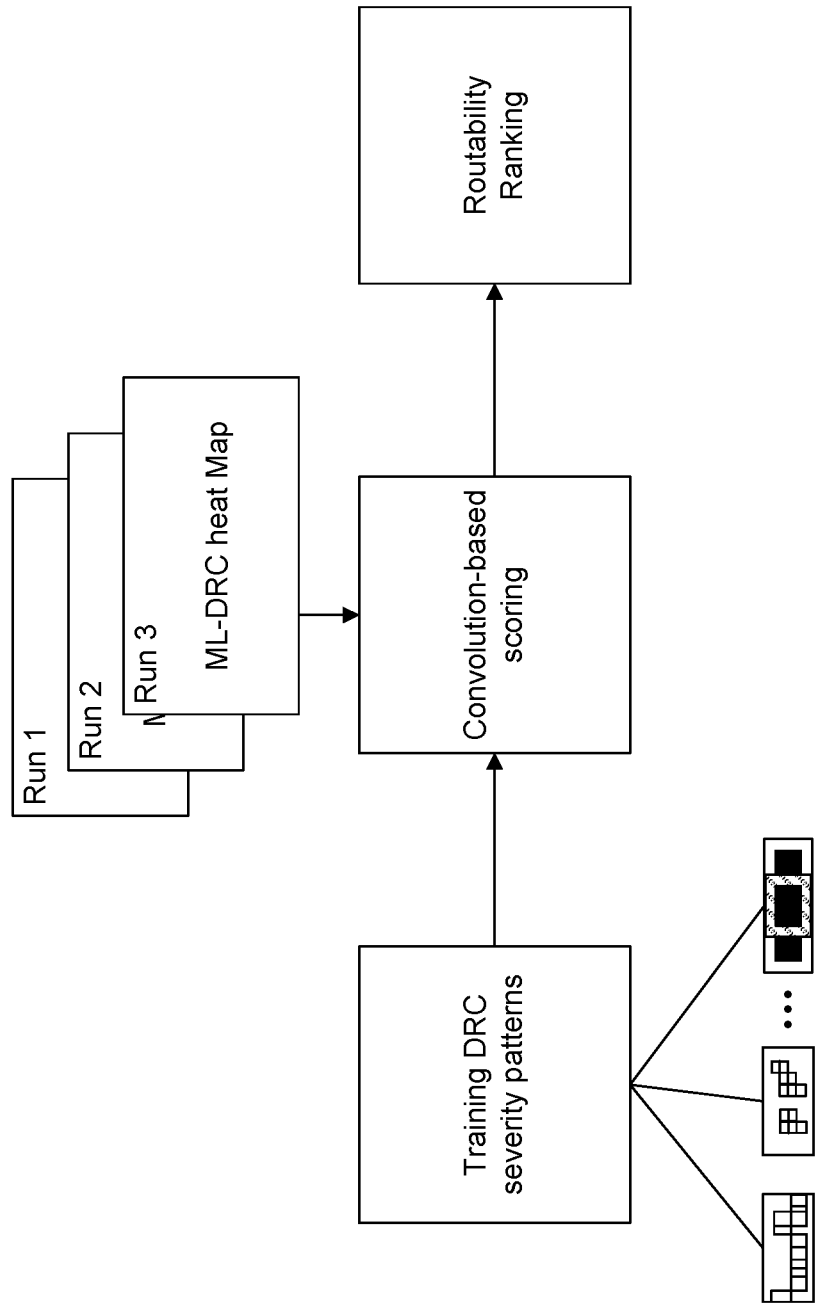
FIG. 13 illustrates an exemplary routing scoring flow, in according with an embodiment.

ML-DRC predictor 306 is used to predict post-route DRCs and to generate canonical representation of different types of DRCs in a given technology node. FIG. 13 illustrates an exemplary routing scoring flow 1300, in according with an embodiment. These representations could be in image (e.g., bitmap) format, in text format, or any other format. The formatted data could be representative of a DRC heat map. In an embodiment, ML-DRC predictor 306 processes a predicted DRC report for each design (or design implementation), performs convolution with a stored canonical representation of DRCs (e.g., training DRC severity patterns, also in a same format as the representations), and computes a novel "routability score". The routability score provides feedback to designers on the DRC-severity of the design (or design implementation), i.e., a low score suggests that the design (or design implementation) has few DRCs and is routable, whereas a high score suggests that the design (or design implementation) has large number of DRCs and may be unroutable. The score can be used to perform a ranking among the designs (or design implementations) to select a best or set of best designs (or design implementations). FIG. 14 illustrates exemplary results 1400 of routability scoring, in accordance with an embodiment. By running the ML-DRC predictor 306, sufficiently trained, on early-stage partial circuit designs, an ML-QoR routing rank can be determined for a hypothetical 7 nm design using the routability scoring that correlates strongly to the actual route-opt DRCs.

Similarly for power prediction, ML-Power predictor 308 predicts power per net (switching) and power per cell (leakage, internal) at 314. ML-Power predictor 308 makes these predictions by receiving unique features 320 from the EDA tool about the partial circuit design that include neighborhood of cell, net, library characteristics, constraints, etc. Likewise, ML-Power predictor 308 is trained using these features from a partial circuit design, tested against ground truth information for the corresponding QoR results from the full circuit design.

Figure 4:
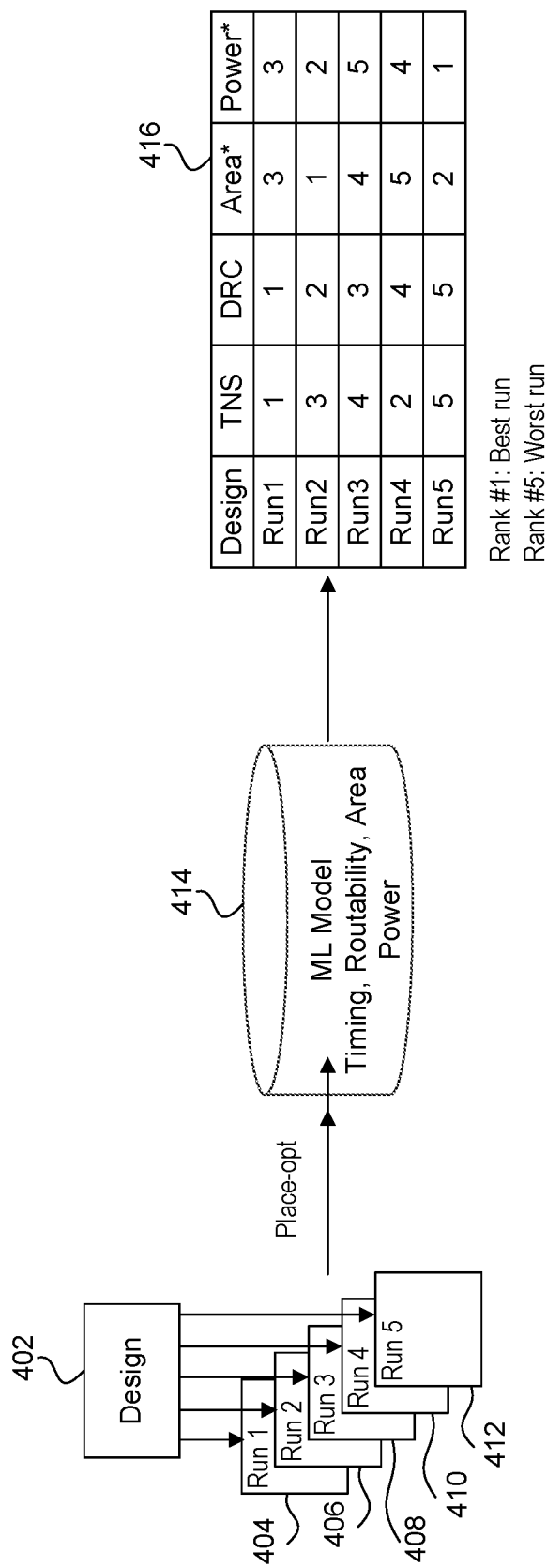
FIG. 4 is a table illustrating a prediction of achievable end-of-flow QoR metrics that enable ranking of design runs using order statistics, in accordance with an embodiment.

FIG. 4 is a table 416 illustrating a prediction of achievable end-of-flow QoR metrics that enable ranking of design runs using order statistics, in accordance with an embodiment. In the exemplary approach 400 shown, a design 402 is run five times (e.g., five different implementations 404, 406, 408, 410, and 412), but can also represent five different designs. The needed features for each ML model in use are provided from an early stage partial circuit design (e.g., place-opt as shown in approach 400) are provided to the one or more ML models 414 and used to compute the rankings for each QoR result for each respective ML model, for each run. Such an application in early flow stages (e.g., synthesis or placement) enables designers to choose designs (or design implementations) that can potentially achieve QoR constraints, and discard the remaining ones, improving productivity.

FIG. 11 depicts an exemplary result of a set of ranking runs in an exemplary design, in accordance with an embodiment. While the notion of a confidence interval as discussed with respect to FIG. 12 above is provided to aid with handling modeling errors, lower CI TNS (i.e., confidence interval of TNS) statistics are used in a unique way to make the prediction and ranking methodology robust. TNS is a function of all endpoint worst negative slacks in a design. As a result, the predicted lower CI TNS (example: 95% lower confidence interval) is presented as the worst-case scenario for a design TNS and a more relevant metric for TNS rank computation. This result is provided without the need to fully design a circuit in a full-flow run.

Figure 5:
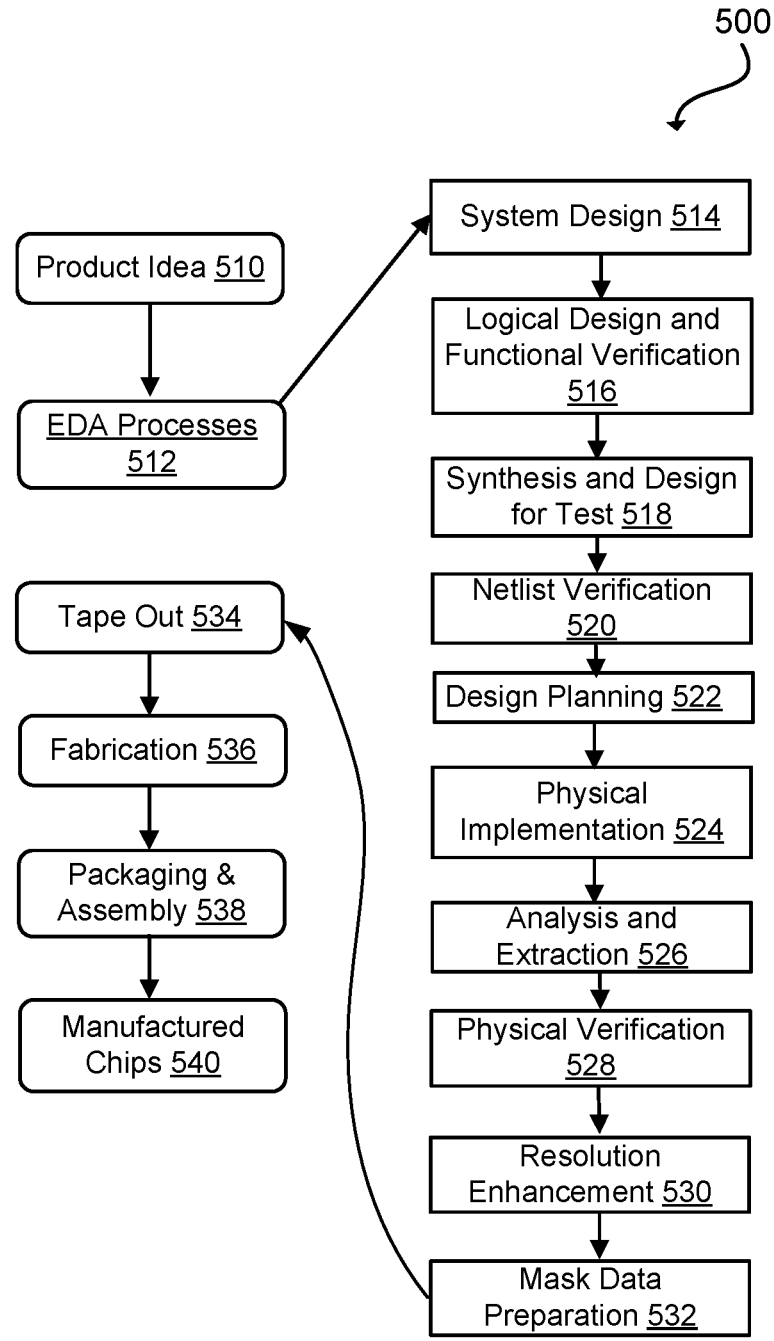
FIG. 5 depicts a flowchart of various processes used during the design and manufacture of an integrated circuit in accordance with some embodiments of the present disclosure.

FIG. 5 illustrates an example set of processes 500 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 510 with information supplied by a designer, information which is transformed to create an article of manufacture that uses a set of EDA processes 512. When the design is finalized, the design is taped-out 534, which is when artwork (e.g., geometric patterns) for the integrated circuit is sent to a fabrication facility to manufacture the mask set, which is then used to manufacture the integrated circuit. After tape-out, a semiconductor die is fabricated 536 and packaging and assembly processes 538 are performed to produce the finished integrated circuit 540.

Specifications for a circuit or electronic structure may range from low-level transistor material layouts to high-level description languages. A high-level of abstraction may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which is used for detailed descriptions of circuits with many analog components. Descriptions at each level of abstraction are enabled for use by the corresponding tools of that layer (e.g., a formal verification tool). A design process may use a sequence depicted in FIG. 5. The processes described by be enabled by EDA products (or tools).

During system design 514, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 516, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 518, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 520, the netlist is checked for compliance with timing constraints and for correspondence with the HDL code. During design planning 522, an overall floor plan for the integrated circuit is constructed and analyzed for timing and top-level routing.

During layout or physical implementation 524, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 526, the circuit function is verified at the layout level, which permits refinement of the layout design. During physical verification 528, the layout design is checked to ensure that manufacturing constraints are correct, such as DRC constraints, electrical constraints, lithographic constraints, and that circuitry function matches the HDL design specification. During resolution enhancement 530, the geometry of the layout is transformed to improve how the circuit design is manufactured.

During tape-out, data is created to be used (after lithographic enhancements are applied if appropriate) for production of lithography masks. During mask data preparation 532, the 'tape-out' data is used to produce lithography masks that are used to produce finished integrated circuits.

A storage subsystem of a computer system (such as computer system 700 of FIG. 7, or host system 607 of FIG. 6) may be used to store the programs and data structures that are used by some or all of the EDA products described herein, and products used for development of cells for the library and for physical and logical design that use the library.

Figure 6:
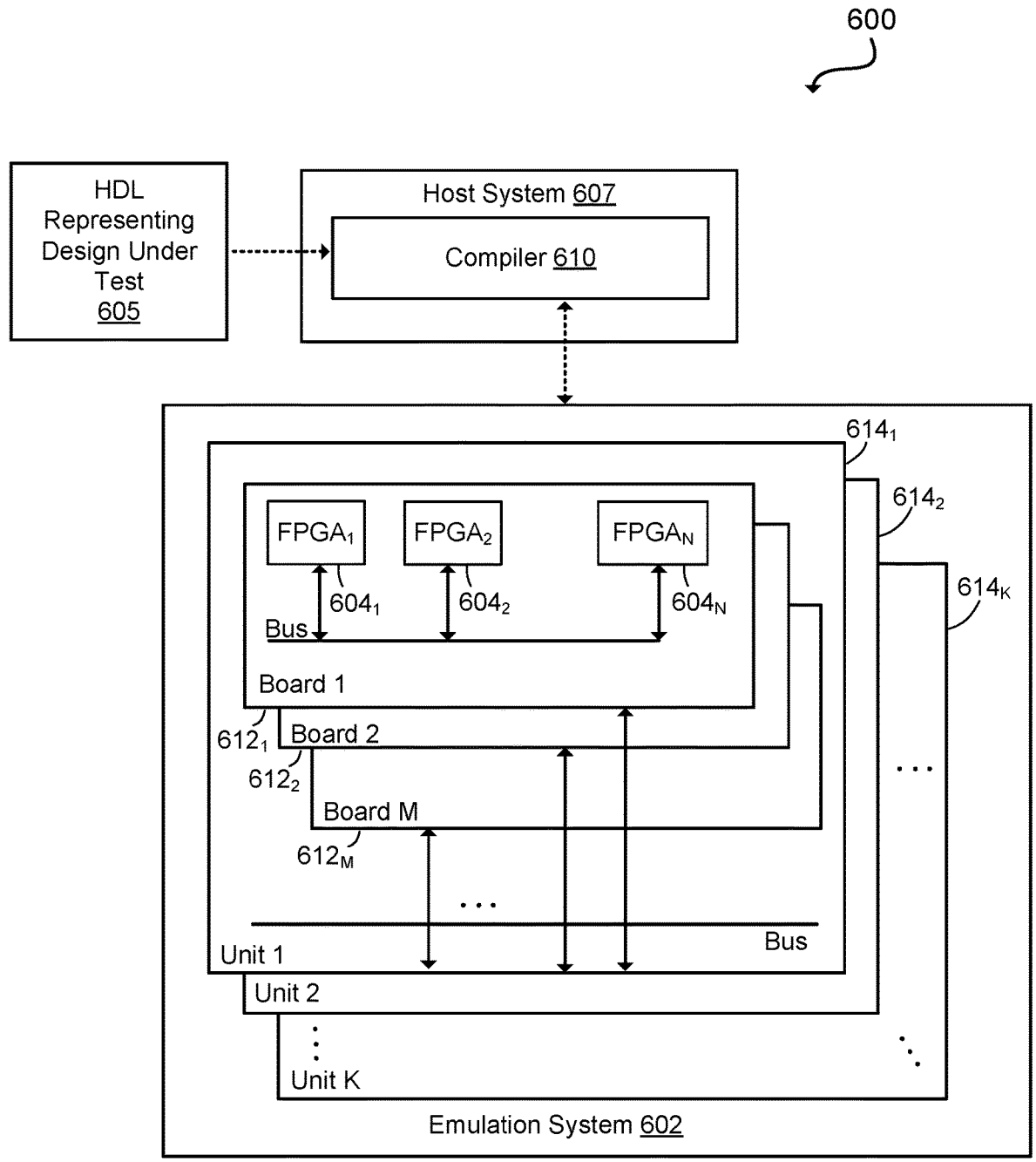
FIG. 6 depicts an abstract diagram of an example emulation system in accordance with some embodiments of the present disclosure.

FIG. 6 depicts an abstract diagram of an example emulation environment 600. An emulation environment 600 may be configured to verify the functionality of the circuit design. The emulation environment 600 may include a host system 607 (e.g., a computer that is part of an EDA system) and an emulation system 602 (e.g., a set of programmable devices such as Field Programmable Gate Arrays (FPGAs) or processors). The host system generates data and information by using a compiler 610 to structure the emulation system to emulate a circuit design. A circuit design to be emulated is also referred to as a Design Under Test ('DUT') where data and information from the emulation are used to verify the functionality of the DUT.

The host system 607 may include one or more processors. In the embodiment where the host system includes multiple processors, the functions described herein as being performed by the host system can be distributed among the multiple processors. The host system 607 may include a compiler 610 to transform specifications written in a description language that represents a DUT and to produce data (e.g., binary data) and information that is used to structure the emulation system 602 to emulate the DUT. The compiler 610 can transform, change, restructure, add new functions to, and/or control the timing of the DUT.

The host system 607 and emulation system 602 exchange data and information using signals carried by an emulation connection. The connection can be, but is not limited to, one or more electrical cables such as cables with pin structures compatible with the Recommended Standard 232 (RS232) or universal serial bus (USB) protocols. The connection can be a wired communication medium or network such as a local area network or a wide area network such as the Internet. The connection can be a wireless communication medium or a network with one or more points of access using a wireless protocol such as BLUETOOTH or IEEE 802.11. The host system 607 and emulation system 602 can exchange data and information through a third device such as a network server.

The emulation system 602 includes multiple FPGAs (or other modules) such as FPGAs $604_1$ and $604_2$ as well as additional FPGAs to $604_N$. Each FPGA can include one or more FPGA interfaces through which the FPGA is connected to other FPGAs (and potentially other emulation components) for the FPGAs to exchange signals. An FPGA interface can be referred to as an input/output pin or an FPGA pad. While an emulator may include FPGAs, embodiments of emulators can include other types of logic blocks instead of, or along with, the FPGAs for emulating DUTs. For example, the emulation system 602 can include custom FPGAs, specialized ASICs for emulation or prototyping, memories, and input/output devices.

A programmable device can include an array of programmable logic blocks and a hierarchy of interconnections that can enable the programmable logic blocks to be interconnected according to the descriptions in the HDL code. Each of the programmable logic blocks can enable complex combinational functions or enable logic gates such as AND, and XOR logic blocks. In some embodiments, the logic blocks also can include memory elements/devices, which can be simple latches, flip-flops, or other blocks of memory. Depending on the length of the interconnections between different logic blocks, signals can arrive at input terminals of the logic blocks at different times and thus may be temporarily stored in the memory elements/devices.

FPGAs $604_1$-$604_N$ may be placed onto one or more boards $612_1$ and $612_2$ as well as additional boards through $612_M$. Multiple boards can be placed into an emulation unit $614_1$. The boards within an emulation unit can be connected using the backplane of the emulation unit or any other types of connections. In addition, multiple emulation units (e.g., $614_1$ and $614_2$ through $614_K$) can be connected to each other by cables or any other means to form a multi-emulation unit system.

For a DUT that is to be emulated, the host system 607 transmits one or more bit files to the emulation system 602. The bit files may specify a description of the DUT and may further specify partitions of the DUT created by the host system 607 with trace and injection logic, mappings of the partitions to the FPGAs of the emulator, and design constraints. Using the bit files, the emulator structures the FPGAs to perform the functions of the DUT. In some embodiments, one or more FPGAs of the emulators may have the trace and injection logic built into the silicon of the FPGA. In such an embodiment, the FPGAs may not be structured by the host system to emulate trace and injection logic.

The host system 607 receives a description of a DUT that is to be emulated. In some embodiments, the DUT description is in a description language (e.g., a register transfer language (RTL)). In some embodiments, the DUT description is in netlist level files or a mix of netlist level files and HDL files. If part of the DUT description or the entire DUT description is in an HDL, then the host system can synthesize the DUT description to create a gate level netlist using the DUT description. A host system can use the netlist of the DUT to partition the DUT into multiple partitions where one or more of the partitions include trace and injection logic. The trace and injection logic traces interface signals that are exchanged via the interfaces of an FPGA. Additionally, the trace and injection logic can inject traced interface signals into the logic of the FPGA. The host system maps each partition to an FPGA of the emulator. In some embodiments, the trace and injection logic is included in select partitions for a group of FPGAs. The trace and injection logic can be built into one or more of the FPGAs of an emulator. The host system can synthesize multiplexers to be mapped into the FPGAs. The multiplexers can be used by the trace and injection logic to inject interface signals into the DUT logic.

The host system creates bit files describing each partition of the DUT and the mapping of the partitions to the FPGAs. For partitions in which trace and injection logic are included, the bit files also describe the logic that is included. The bit files can include place and route information and design constraints. The host system stores the bit files and information describing which FPGAs are to emulate each component of the DUT (e.g., to which FPGAs each component is mapped).

Upon request, the host system transmits the bit files to the emulator. The host system signals the emulator to start the emulation of the DUT. During emulation of the DUT or at the end of the emulation, the host system receives emulation results from the emulator through the emulation connection. Emulation results are data and information generated by the emulator during the emulation of the DUT which include interface signals and states of interface signals that have been traced by the trace and injection logic of each FPGA. The host system can store the emulation results and/or transmits the emulation results to another processing system.

After emulation of the DUT, a circuit designer can request to debug a component of the DUT. If such a request is made, the circuit designer can specify a time period of the emulation to debug. The host system identifies which FPGAs are emulating the component using the stored information. The host system retrieves stored interface signals associated with the time period and traced by the trace and injection logic of each identified FPGA. The host system signals the emulator to re-emulate the identified FPGAs. The host system transmits the retrieved interface signals to the emulator to re-emulate the component for the specified time period. The trace and injection logic of each identified FPGA injects its respective interface signals received from the host system into the logic of the DUT mapped to the FPGA. In case of multiple re-emulations of an FPGA, merging the results produces a full debug view.

The host system receives, from the emulation system, signals traced by logic of the identified FPGAs during the re-emulation of the component. The host system stores the signals received from the emulator. The signals traced during the re-emulation can have a higher sampling rate than the sampling rate during the initial emulation. For example, in the initial emulation a traced signal can include a saved state of the component every X milliseconds. However, in the re-emulation the traced signal can include a saved state every Y milliseconds where Y is less than X. If the circuit designer requests to view a waveform of a signal traced during the re-emulation, the host system can retrieve the stored signal and display a plot of the signal. For example, the host system can generate a waveform of the signal. Afterwards, the circuit designer can request to re-emulate the same component for a different time period or to re-emulate another component.

A host system 607 and/or the compiler 610 may include sub-systems such as, but not limited to, a design synthesizer sub-system, a mapping sub-system, a run time sub-system, a results sub-system, a debug sub-system, a waveform sub-system, and a storage sub-system. The sub-systems can be structured and enabled as individual or multiple modules or two or more may be structured as a module. Together these sub-systems structure the emulator and monitor the emulation results.

The design synthesizer sub-system transforms the HDL that is representing a DUT 605 into gate level logic. For a DUT that is to be emulated, the design synthesizer sub-system receives a description of the DUT. If the description of the DUT is fully or partially in HDL (e.g., RTL or other level of abstraction), the design synthesizer sub-system synthesizes the HDL of the DUT to create a gate-level netlist with a description of the DUT in terms of gate level logic.

The mapping sub-system partitions DUTs and maps the partitions into emulator FPGAs. The mapping sub-system partitions a DUT at the gate level into a number of partitions using the netlist of the DUT. For each partition, the mapping sub-system retrieves a gate level description of the trace and injection logic and adds the logic to the partition. As described above, the trace and injection logic included in a partition is used to trace signals exchanged via the interfaces of an FPGA to which the partition is mapped (trace interface signals). The trace and injection logic can be added to the DUT prior to the partitioning. For example, the trace and injection logic can be added by the design synthesizer sub-system prior to or after the synthesizing the HDL of the DUT.

In addition to including the trace and injection logic, the mapping sub-system can include additional tracing logic in a partition to trace the states of certain DUT components that are not traced by the trace and injection. The mapping sub-system can include the additional tracing logic in the DUT prior to the partitioning or in partitions after the partitioning. The design synthesizer sub-system can include the additional tracing logic in an HDL description of the DUT prior to synthesizing the HDL description.

The mapping sub-system maps each partition of the DUT to an FPGA of the emulator. For partitioning and mapping, the mapping sub-system uses design rules, design constraints (e.g., timing or logic constraints), and information about the emulator. For components of the DUT, the mapping sub-system stores information in the storage sub-system describing which FPGAs are to emulate each component.

Using the partitioning and the mapping, the mapping sub-system generates one or more bit files that describe the created partitions and the mapping of logic to each FPGA of the emulator. The bit files can include additional information such as constraints of the DUT and routing information of connections between FPGAs and connections within each FPGA. The mapping sub-system can generate a bit file for each partition of the DUT and can store the bit file in the storage sub-system. Upon request from a circuit designer, the mapping sub-system transmits the bit files to the emulator, and the emulator can use the bit files to structure the FPGAs to emulate the DUT.

If the emulator includes specialized ASICs that include the trace and injection logic, the mapping sub-system can generate a specific structure that connects the specialized ASICs to the DUT. In some embodiments, the mapping sub-system can save the information of the traced/injected signal and where the information is stored on the specialized ASIC.

The run time sub-system controls emulations performed by the emulator. The run time sub-system can cause the emulator to start or stop executing an emulation. Additionally, the run time sub-system can provide input signals and data to the emulator. The input signals can be provided directly to the emulator through the connection or indirectly through other input signal devices. For example, the host system can control an input signal device to provide the input signals to the emulator. The input signal device can be, for example, a test board (directly or through cables), signal generator, another emulator, or another host system.

The results sub-system processes emulation results generated by the emulator. During emulation and/or after completing the emulation, the results sub-system receives emulation results from the emulator generated during the emulation. The emulation results include signals traced during the emulation. Specifically, the emulation results include interface signals traced by the trace and injection logic emulated by each FPGA and can include signals traced by additional logic included in the DUT. Each traced signal can span multiple cycles of the emulation. A traced signal includes multiple states and each state is associated with a time of the emulation. The results sub-system stores the traced signals in the storage sub-system. For each stored signal, the results sub-system can store information indicating which FPGA generated the traced signal.

The debug sub-system allows circuit designers to debug DUT components. After the emulator has emulated a DUT and the results sub-system has received the interface signals traced by the trace and injection logic during the emulation, a circuit designer can request to debug a component of the DUT by re-emulating the component for a specific time period. In a request to debug a component, the circuit designer identifies the component and indicates a time period of the emulation to debug. The circuit designer's request can include a sampling rate that indicates how often states of debugged components should be saved by logic that traces signals.

The debug sub-system identifies one or more FPGAs of the emulator that are emulating the component using the information stored by the mapping sub-system in the storage sub-system. For each identified FPGA, the debug sub-system retrieves, from the storage sub-system, interface signals traced by the trace and injection logic of the FPGA during the time period indicated by the circuit designer. For example, the debug sub-system retrieves states traced by the trace and injection logic that are associated with the time period.

The debug sub-system transmits the retrieved interface signals to the emulator. The debug sub-system instructs the debug sub-system to use the identified FPGAs and for the trace and injection logic of each identified FPGA to inject its respective traced signals into logic of the FPGA to re-emulate the component for the requested time period. The debug sub-system can further transmit the sampling rate provided by the circuit designer to the emulator so that the tracing logic traces states at the proper intervals.

To debug the component, the emulator can use the FPGAs to which the component has been mapped. Additionally, the re-emulation of the component can be performed at any point specified by the circuit designer.

For an identified FPGA, the debug sub-system can transmit instructions to the emulator to load multiple emulator FPGAs with the same configuration of the identified FPGA. The debug sub-system additionally signals the emulator to use the multiple FPGAs in parallel. Each FPGA from the multiple FPGAs is used with a different time window of the interface signals to generate a larger time window in a shorter amount of time. For example, the identified FPGA can require an hour or more to use a certain amount of cycles. However, if multiple FPGAs have the same data and structure of the identified FPGA and each of these FPGAs runs a subset of the cycles, the emulator can require a few minutes for the FPGAs to collectively use all the cycles.

A circuit designer can identify a hierarchy or a list of DUT signals to re-emulate. To enable this, the debug sub-system determines the FPGA needed to emulate the hierarchy or list of signals, retrieves the necessary interface signals, and transmits the retrieved interface signals to the emulator for re-emulation. Thus, a circuit designer can identify any element (e.g., component, device, or signal) of the DUT to debug/re-emulate.

The waveform sub-system generates waveforms using the traced signals. If a circuit designer requests to view a waveform of a signal traced during an emulation run, the host system retrieves the signal from the storage sub-system. The waveform sub-system displays a plot of the signal. For one or more signals, when the signals are received from the emulator, the waveform sub-system can automatically generate the plots of the signals.

Figure 7:
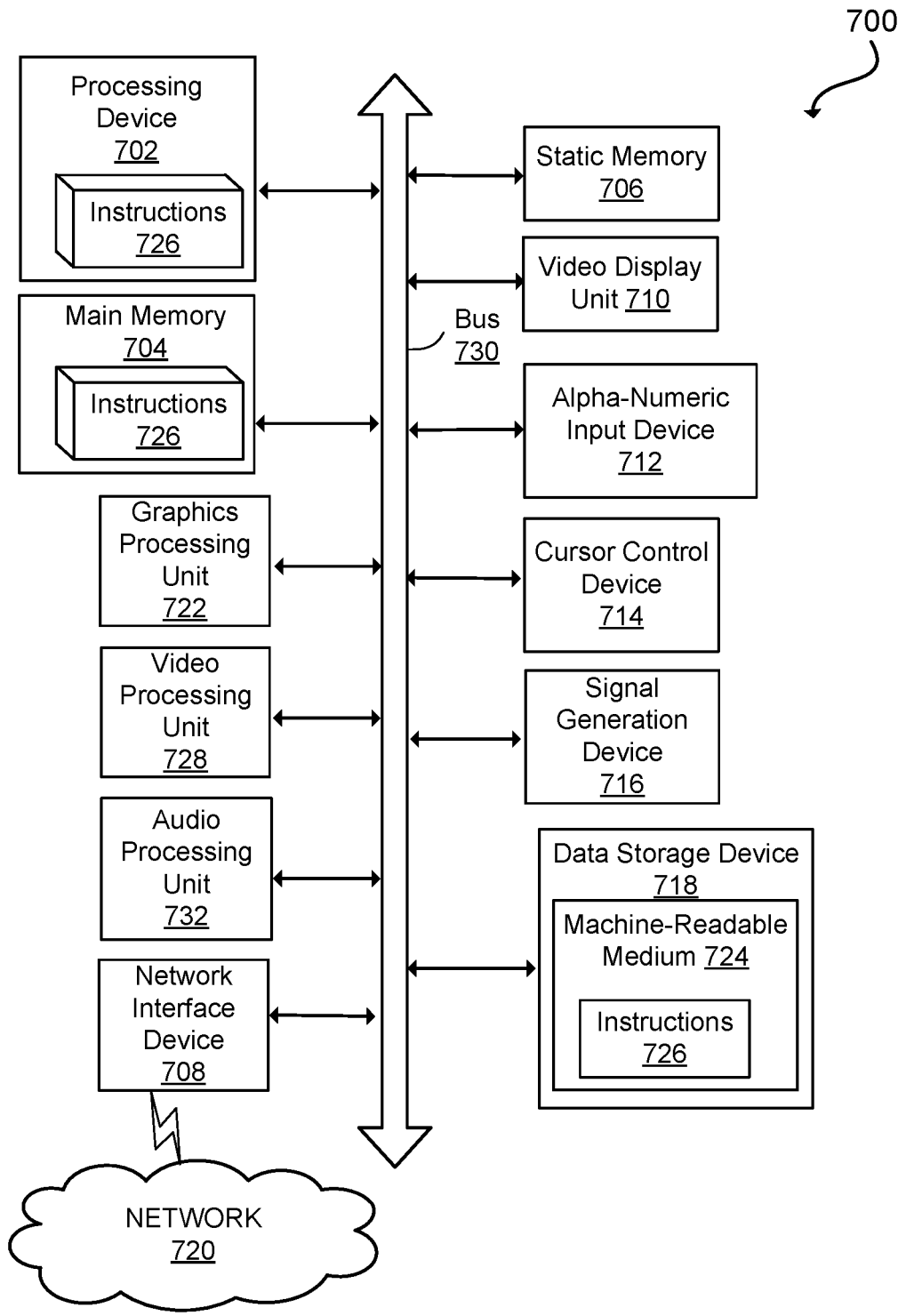
FIG. 7 depicts an abstract diagram of an example computer system in which embodiments of the present disclosure may operate.

FIG. 7 illustrates an example machine of a computer system 700 within which a set of instructions, for causing the machine to perform any one or more of the methodologies discussed herein, may be executed. In alternative implementations, the machine may be connected (e.g., networked)

to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM), a static memory 706 (e.g., flash memory, static random access memory (SRAM), etc.), and a data storage device 718, which communicate with each other via a bus 730.

Processing device 702 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 may be configured to execute instructions 726 for performing the operations and steps described herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a non-transitory computer-readable medium) on which is stored one or more sets of instructions 726 or software embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In some implementations, the instructions 726 include instructions to implement functionality corresponding to the present disclosure. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 702 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method, comprising:
    generating, by one or more processors, a pre-route partial circuit design run for a circuit;
    producing, by the one or more processors, a predicted post-route quality-of-result (QoR) metric for the pre-route partial circuit design run by executing a machine learning (ML) model on a plurality of pre-route features of the pre-route partial circuit design run, wherein the ML model is trained using pre-route features extracted from a training circuit at a development phase and actual post-route QoR metrics from a completed design run of the training circuit, wherein the completed design run of the training circuit comprises routes corresponding to connectors connecting circuit components of the circuit and wherein the actual post-route QoR metrics are computed based on the routes of the completed design run;
    determining, by the one or more processors and based on the predicted post-route QoR metric, that the pre-route partial circuit design run satisfies a constraint on the predicted post-route QoR metric; and
    executing, by the one or more processors, a complete circuit design run for the circuit from the pre-route partial circuit design run based on the determination that the pre-route partial circuit design run satisfies the constraint.

2. The method of claim 1, further comprising:
    generating, by the one or more processors, an additional pre-route partial circuit design run for the circuit;
    producing, by the one or more processors, an additional predicted post-route QoR metric for the additional pre-route partial circuit design run by executing the ML model on a plurality of additional pre-route features of the additional pre-route partial circuit design run;
    ranking, by the one or more processors, the pre-route partial circuit design run against the additional pre-route partial circuit design run based on the predicted post-route QoR metric and the additional predicted post-route QoR metric; and
    selecting, by the one or more processors, the pre-route partial circuit design run for the execution of the complete circuit design run based on the pre-route partial circuit design run being ranked higher than the additional pre-route partial circuit design run based on the predicted post-route QoR metric and the additional predicted post-route QoR metric.

3. The method of claim 1, wherein executing the ML model on the pre-route partial circuit design run comprises:
    extracting, by the one or more processors, the pre-route features from the pre-route partial circuit design run; and
    providing, by the one or more processors, the pre-route features from the pre-route partial circuit design run to the ML model as an input,
    wherein the pre-route features include at least one of netlist features, timing constraints, electrical features, or physical features of the pre-route partial circuit design run.

4. The method of claim 1, wherein the post-route QoR metric for the pre-route partial circuit design run includes delay and slack per timing endpoint in the circuit.

5. The method of claim 1, wherein the predicted post-route QoR metric for the pre-route partial circuit design run includes design rule checking (DRC) severity in the circuit.

6. The method of claim 5, wherein the DRC severity is represented as a heat map and the pre-route features extracted from the training circuit include training DRC severity heat map patterns, producing the predicted post-route QoR metric further comprising:
    convolving, by the one or more processors, the heat map and the training DRC severity heat map patterns to produce a routability score.

7. The method of claim 1, wherein the post-route QoR metric for the pre-route partial circuit design run includes power per net and power per cell in the circuit.

8. A system, comprising:
    a memory configured to store operations; and
    one or more processors configured to perform the operations, the operations comprising:
        generating a partial circuit design run for a circuit,
        producing a predicted quality-of-result (QoR) metric for the partial circuit design run by executing a machine learning (ML) model on the partial circuit design run, wherein the ML model is trained using features extracted from a training circuit at a development phase and actual QoR metrics from a completed design run of the training circuit,
        determining, based on the predicted QoR metric, that the partial circuit design run satisfies a constraint on the predicted QoR metric, and
        executing a complete circuit design run for the circuit from the partial circuit design run based on the determination that the partial circuit design run satisfies the constraint,
    wherein the QoR metric for the partial circuit design run includes design rule checking (DRC) severity in the circuit, and
    wherein the DRC severity is represented as a heat map and the features extracted from the training circuit include training DRC severity heat map patterns.

9. The system of claim 8, the operations further comprising:
    generating an additional partial circuit design run for the circuit,
    producing an additional predicted QoR metric for the additional partial circuit design run by executing the ML model on the additional partial circuit design run,
    ranking the partial circuit design run against the additional partial circuit design run based on the predicted QoR metric and the additional predicted QoR metric, and
    selecting the partial circuit design run for the execution of the complete circuit design run based on the partial circuit design run being ranked higher than the additional partial circuit design run based on the predicted QoR metric and the additional predicted QoR metric.

10. The system of claim 8, wherein executing the ML model on the partial circuit design run comprises:
   extracting one or more features from the partial circuit design run; and
   providing the one or more features from the partial circuit design run to the ML model as an input,
   wherein the one or more features include at least one of netlist features, timing constraints, electrical features, or physical features of the partial circuit design run.

11. The system of claim 8, wherein the QoR metric for the partial circuit design run includes delay and slack per timing endpoint in the circuit.

12. The system of claim 8, wherein producing the predicted QoR metric further comprises:
   convolving the heat map and the training DRC severity heat map patterns to produce a routability score.

13. The system of claim 8, wherein the QoR metric for the partial circuit design run includes power per net and power per cell in the circuit.

14. A computer readable storage device having instructions stored thereon, execution of which, by one or more processing devices, causes the one or more processing devices to perform operations comprising:
   generating a pre-route partial circuit design run for a circuit;
   producing a predicted post-route quality-of-result (QoR) metric for the pre-route partial circuit design run by executing a machine learning (ML) model on a plurality of pre-route features of the pre-route partial circuit design run, wherein the ML model is trained using features extracted from a training circuit at a development phase and actual QoR metrics from a completed design run of the training circuit, wherein the completed design run of the training circuit comprises routes corresponding to connectors connecting circuit components of the circuit and wherein the actual post-route QoR metrics are computed based on the routes of the completed design run;
   determining, based on the predicted post-route QoR metric, that the pre-route partial circuit design run satisfies a constraint on the predicted post-route QoR metric; and
   executing a complete circuit design run for the circuit from the pre-route partial circuit design run based on the determination that the pre-route partial circuit design run satisfies the constraint.

15. The computer readable storage device of claim 14, the operations further comprising:
   generating an additional pre-route partial circuit design run for the circuit;
   producing an additional predicted post-route QoR metric for the additional pre-route partial circuit design run by executing the ML model on a plurality of additional pre-route features of the additional pre-route partial circuit design run;
   ranking the pre-route partial circuit design run against the additional pre-route partial circuit design run based on the predicted post-route QoR metric and the additional predicted post-route QoR metric; and
   selecting the pre-route partial circuit design run for the execution of the complete circuit design run based on the pre-route partial circuit design run being ranked higher than the additional pre-route partial circuit design run based on the predicted post-route QoR metric and the additional predicted post-route QoR metric.

16. The computer readable storage device of claim 14, wherein executing the ML model on the pre-route partial circuit design run comprises:
   extracting the pre-route features from the pre-route partial circuit design run; and
   providing the pre-route features from the pre-route partial circuit design run to the ML model as an input,
   wherein the pre-route features include at least one of netlist features, timing constraints, electrical features, or physical features of the pre-route partial circuit design run.

17. The computer readable storage device of claim 14, wherein the predicted post-route QoR metric for the pre-route partial circuit design run includes delay and slack per timing endpoint in the circuit.

18. The computer readable storage device of claim 14, wherein the QoR metric for the pre-route partial circuit design run includes design rule checking (DRC) severity in the circuit.

19. The computer readable storage device of claim 18, wherein the DRC severity is represented as a heat map and the pre-route features extracted from the training circuit include training DRC severity heat map patterns, producing the predicted post-route QoR metric further comprising:
   convolving the heat map and the training DRC severity heat map patterns to produce a routability score.

* * * * *